No. 867,229. PATENTED OCT. 1, 1907.
T. O. BATES.
MEANS FOR SUPPLYING FLUIDS TO BAKING MACHINES.
APPLICATION FILED NOV. 27, 1906.
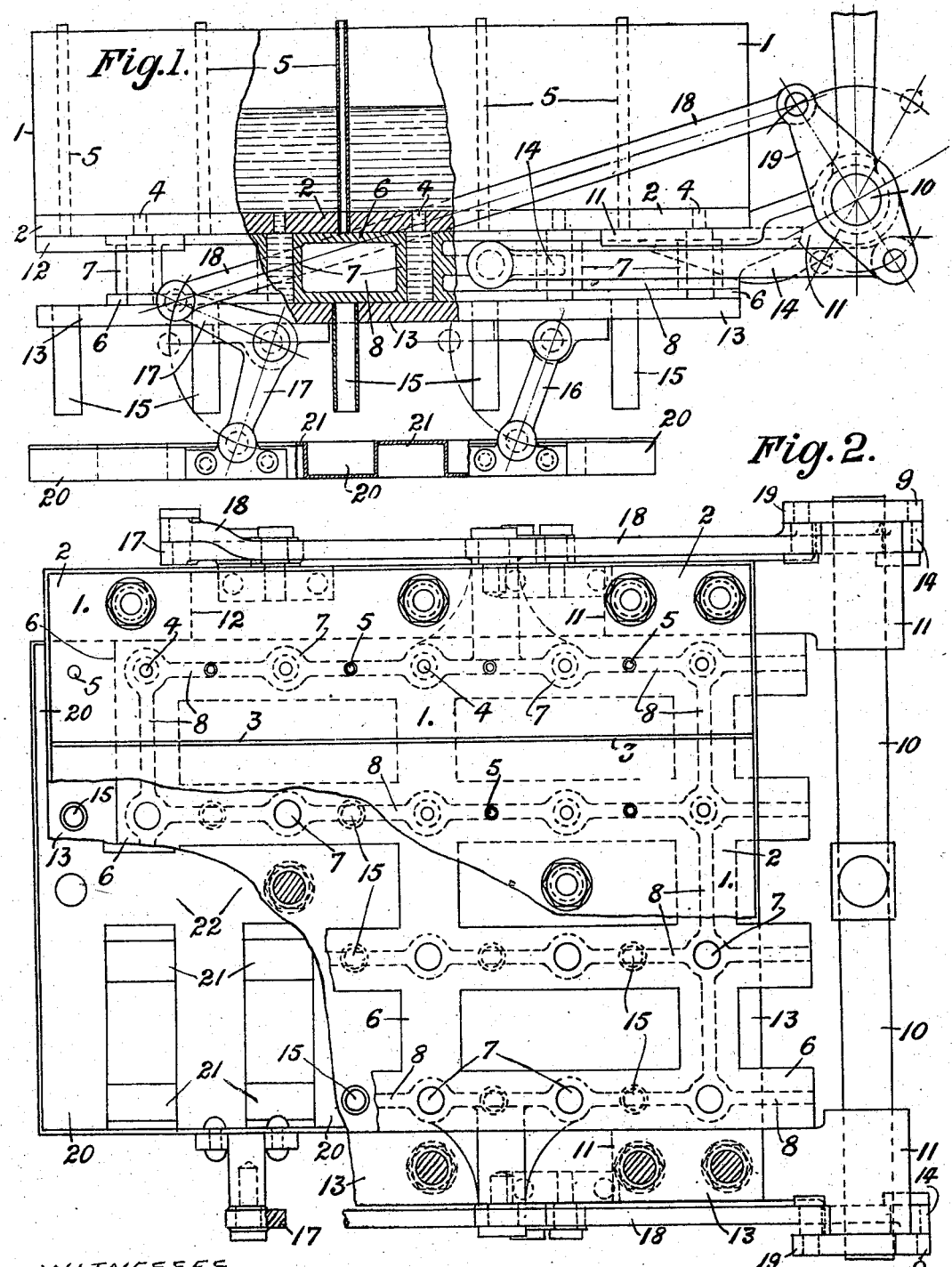
WITNESSES
W. P. Burke
M. Pett
INVENTOR
Thomas Owen Bates
By Richardson ATTYS

UNITED STATES PATENT OFFICE.

THOMAS OWEN BATES, OF LIVERPOOL, ENGLAND.

MEANS FOR SUPPLYING FLUIDS TO BAKING-MACHINES.

No. 867,229.      Specification of Letters Patent.      Patented Oct. 1, 1907.

Application filed November 27, 1906. Serial No. 345,378.

*To all whom it may concern:*

Be it known that I, THOMAS OWEN BATES, a subject of the King of England, residing at Liverpool, in the county of Lancaster, England, have invented new and useful Improvements in Means for Supplying Fluids to Baking-Machines, of which the following is a specification.

This invention has reference primarily to the supplying of fluids or liquids to baking or cooking machines, such as machines for baking biscuits, sugar wafer cups, wafer biscuits, and the like, where a plurality of matrices or vessels are to be intermittently supplied with a charge of material to be baked in a fluid form.

In a feeding or supplying apparatus involving the improvements hereunder—which are set out in the claiming clauses concluding the specification—there is employed a reservoir or vessel containing the fluid to be supplied in bulk, having in its bottom a plurality of apertures for the flow of the fluid; and below this vessel or container there is a sliding device with a plurality of chambers or pockets corresponding in number and disposition with the holes in the bottom of the container; while again, below this sliding chambered device, there is a plate also with a corresponding number and disposition of holes, adapted to serve as the discharge apertures of the apparatus; and these apertures have preferably in connection with them below, tubes or conduits, down which the separate charges flow to the matrices or chambers of the baking machine. The apertures in the container, and those in the discharge plate or part below, are not disposed opposite each other; and they are so arranged, and the sliding device is so adapted to work, that the chambers or pockets in the latter can be first moved under the holes in the container, and then out of communication with them (being also out of communication with the holes in the lower or discharge plate), and then into communication with the holes in the lower plate; whereby in the reciprocating motion of the sliding feeding device, the pockets or chambers of it are first filled, and then the contents of same are discharged through the apertures in the lower discharge plate, and preferably through spouts or conduits extending down from same, into the baking matrices or receptacles of the machine. In connection with this apparatus there is employed a movable tray adapted, when the liquid is being discharged from the movable or sliding part containing the pockets or chambers through the discharge conduits, to be out of the way; while when the discharge has taken place into the matrices or receptacles of the baking apparatus, this tray is moved up, and the parts adapted to serve as channels come under the discharge tubes, and will catch the drippings from them, and convey it away.

The drawings which illustrate the invention show in Figure 1 a side elevation, partly in section, of the machine; and Fig. 2 a plan with parts broken away.

Referring now to these drawings, 1 generally designates the reservoir or vessel containing the fluid to be supplied; 6 is the sliding device with chambers or pockets; and 13 is the lower plate containing the discharge apertures.

The reservoir or vessel 1 may consist of a single chamber, or it may be partitioned off into several chambers to suit circumstances; one of such partitions being shown and marked 3. In the bottom plate 2 of the chamber, several supply holes 4 are provided; and at points between these holes, tubes 5 are fitted which extend up to a suitable height, by means of which air is supplied to the chambers to allow them to empty when in the discharging position.

With regard to the sliding chambered device 6, 7 are the chambers in it which are open above and below, and these open ends work in connection with the bottom plate 2 of the vessel 1, the discharge plate or device 13 being below. These chambers 7 may be advantageously of simple parallel cylindrical form, joined together with webs 8 as shown, with spaces between them, closed above and below by upper and lower plates.

The chambered device 6 is rocked to and fro under the plate 2 by arms 9 fixed on either end of a shaft 10, carried by brackets 11 from the underside of the plate 2; such brackets and plates 12 serving as guides to the slide 6; and the arms 9 being connected up with the sliding device 6 on each side by connecting rods 14.

The upper plate of the device 6 will be made of such a length that it forms "lap", so that the end holes 4 of the vessel 1 will never be uncovered by it.

The discharge plate or device 13—which is stationary—is provided with discharge tubes 15, these tubes being disposed at points intermediate the holes 4 of the bottom of the vessel 1, and vertically under the tubes 5; such tubes 5, chambers 7, and tubes 15, being all in the vertical plane, in which the sliding device 6 moves.

In the construction shown, a movable tray 20 below the plate 13 and tubes 15, is employed; this tray being carried from the plate 13 by rocking links 16 at one end, and by one arm of the bell crank levers 17 at the other, the other arm of such levers being connected by connecting rods 18 with arms 19 (preferably formed in one with the arms 9) on the shaft 10. The rocking therefore to and fro of the shaft 10, produces an opposite movement to and fro in the arms 9 and 19, respectively. The tray 20 is in the form of a rectangular corrugated plate, the alternate portions of the parts projecting below the upper surface, being in the form of and constituting so many channels, pitched apart at the same distance as the chambers 7 and tubes 15. At times ther than when the chambers 7 are discharging their contents, this tray 20 will be in its lower position, and the channels will lie directly beneath the discharge tubes 15, and will receive all drippings from them, and so collect them; while when the chambers 7 are discharging, this tray is moved up above the lower end of, and quite clear of, the tubes 15; slots or openings 21 being provided in the upper portion of the tray between the channels, to allow it to so move up over the tubes.

At the center of the tray 20 a transverse channel 22 (a part of which is shown in Fig. 2) is provided, into which the channels on either side of it lead, and into which they discharge; and this central canal or channel can discharge into any suitable vessel, so that all the drippings and drainings are carried off, and the apparatus rendered cleanly.

In action, when the chambers of the chambered device 6 are being filled, namely, when it is in the position shown in the drawing, the upper end of these chambers will be coincident with the holes 4 in the container bottom 2, and their lower ends will be closed by the lower discharge plate 13. Then, to discharge this material from them, the device 6 is moved forward by the arms 9 and connecting rods 14, so that the chambers 7 come under the air supply tubes 15 of the plate 13; and they can then empty themselves into the several chambers, pockets or matrices of the cooking machine to be charged with batter or the like.

If the heat of the cooking apparatus is very high, the discharge tubes 15 may be suitably cooled artificially by surrounding them with tubes or jackets through which cooling fluid can be passed.

The apparatus can be worked by hand, or by machinery.

What is claimed is:—

1. In apparatus or means for supplying fluid to cooking machines such as referred to, the combination with the vibrating horizontally sliding chambered device 6 and discharge plate or device, as 13, of a tray 20, adapted to be moved alternately so as to be under the discharge apertures of the apparatus, and clear of same; for the purposes set forth.

2. An apparatus for supplying material to cooking machines comprising a container having openings in its bottom, a sliding chambered device below said bottom adapted to receive the material from the container, a discharge plate below said device, discharge tubes projecting therefrom, a tray 20 suspended below said tubes and having openings therein and means for raising said tray obliquely so that the tubes will pass through the said openings.

In testimony whereof I have signed my name to this specification in the presence of two subscribing witnesses.

THOMAS OWEN BATES.

Witnesses:
 S. GOODALL,
 G. OKS.